June 4, 1957 — T. J. DUNN — 2,794,330
AUTOMOTIVE AIR CONDITIONER
Filed Feb. 3, 1956 — 2 Sheets-Sheet 1

INVENTOR.
THOMAS J. DUNN
BY
McMorrow, Berman + Davidson
ATTORNEYS

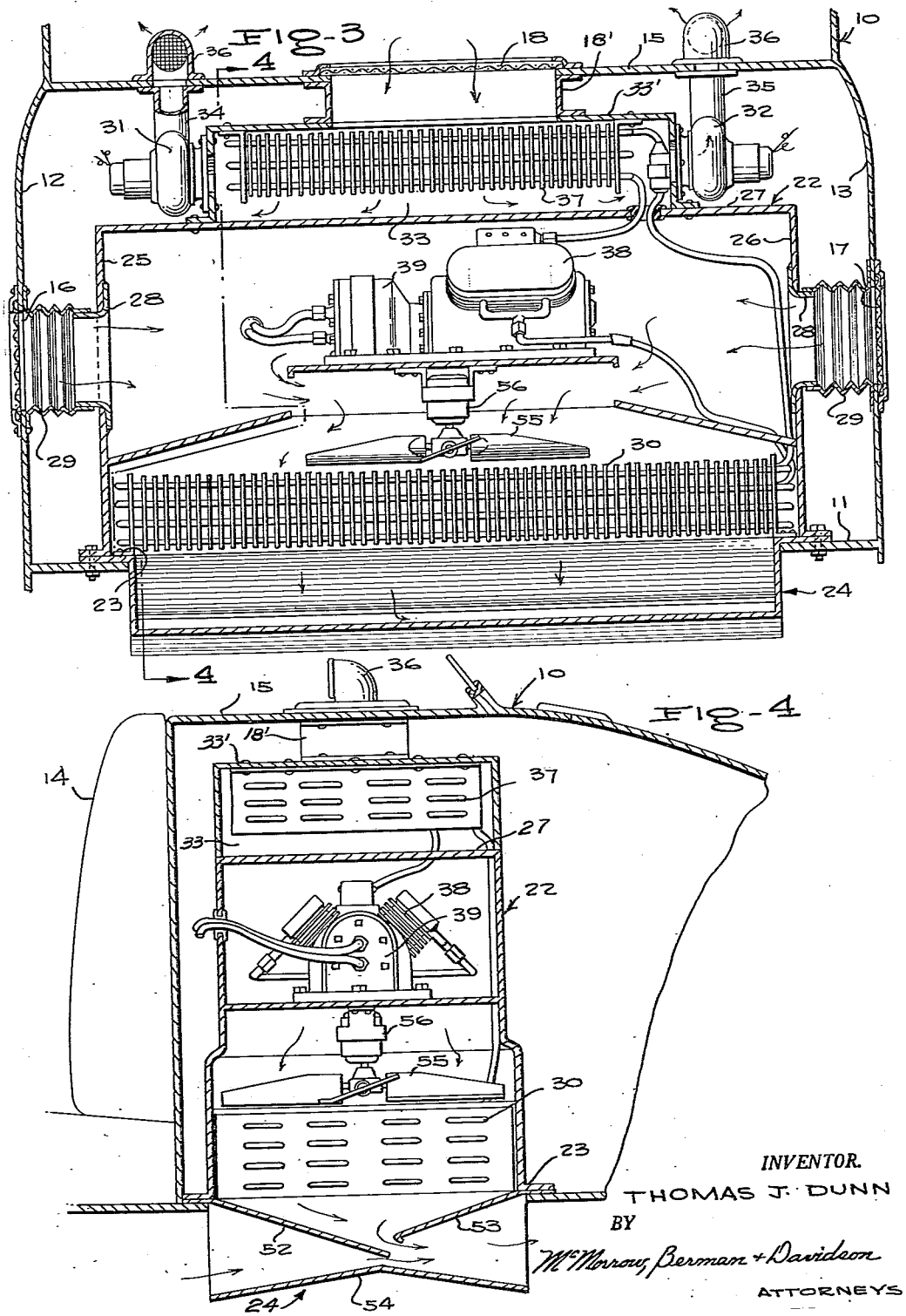

United States Patent Office 2,794,330
Patented June 4, 1957

2,794,330
AUTOMOTIVE AIR CONDITIONER

Thomas J. Dunn, Hackettstown, N. J.

Application February 3, 1956, Serial No. 563,264

4 Claims. (Cl. 62—117.1)

The present invention relates to an air conditioning unit which lends itself for ready installation in any passenger type of automobile.

An object of the present invention is to provide an air conditioning unit which is adapted for mounting in the part of the automobile body not subject to the heat of the engine and which is operable by the engine crankshaft.

Another object of the present invention is to provide an air conditioning unit in which the compressor is driven by the engine crankshaft and at a constant speed irrespective of the change of speed of such crankshaft.

A further object of the present invention is to provide an air conditioning unit which is compact, easy to install in a conventional passenger automobile, highly efficient in operation, and commercially feasible.

Figure 1:
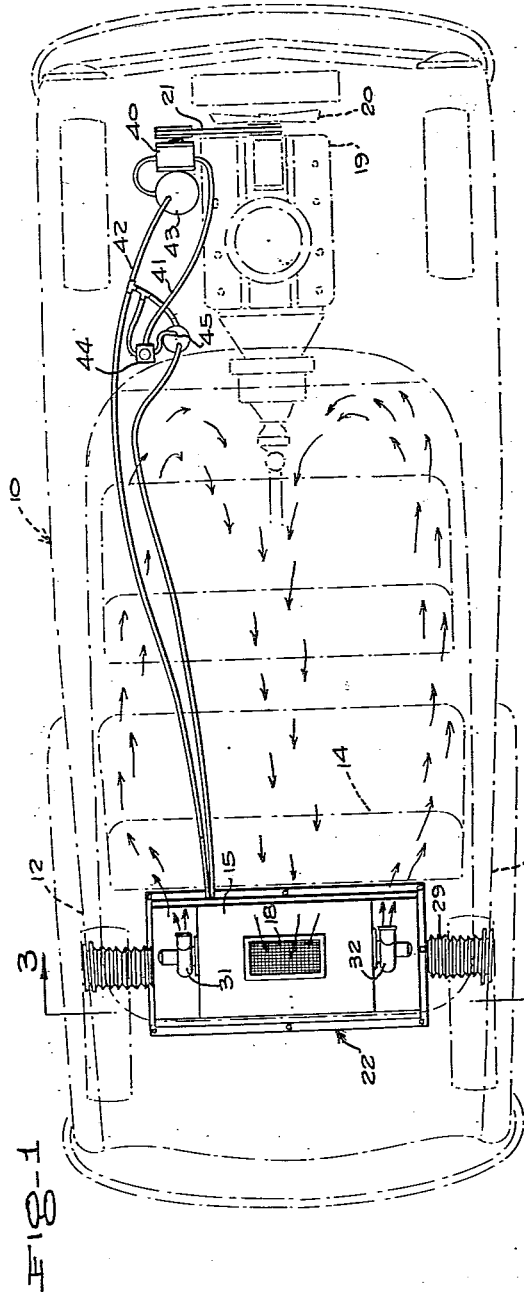
Figure 2:
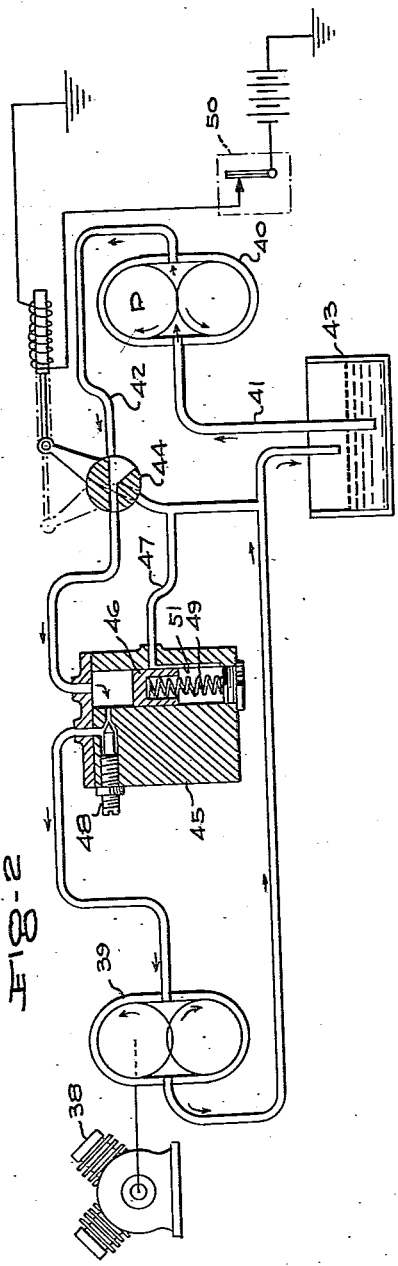

These and other objects and advantages of the present invention will be fully apparent from the following description when taken in connection with the annexed drawings, in which:

Figure 1 is a plan view of the air conditioning unit of the present invention shown installed within an automobile, the latter being shown in dotted lines, Figure 2 is a diagrammatic view of the components of the air conditioning unit of the present invention, Figure 3 is a view in section, on an enlarged scale, taken on the line 3—3 of Figure 1, and Figure 4 is a sectional view taken on the line 4—4 of Figure 3.

Referring in greater detail to the drawings in which like numerals indicate like parts throughout the several views, the air conditioning unit of the present invention is for use in combination with an automobile having a body 10, the body 10 including a floor 11, automobile sides 12 and 13, a rear seat 14 in the passenger compartment of the body 10, and a shelf 15 in back of the rear seat 14. The body 10 is provided with a pair of inlets 16 and 17 in the sides 12 and 13, respectively, below the shelf 15 and rearwardly of the rear seat 14. The shelf 15 has an inlet 18 positioned intermediate the ends of the shelf 15.

The automobile engine is shown in dotted lines in Figure 1 at 19 and includes a crankshaft having an end portion exteriorly of and forwardly of the passenger compartment of the automobile. A fan 20 is operatively driven by the crankshaft end portion, there being a fan belt 21 connecting the fan 20 to the automobile generator and other accessories.

The air conditioning unit of the present invention comprises an upstanding housing 22 including a bottom 23 and an open-ended tunnel 24 extending transversely of the bottom 23 and having its top opening into the housing bottom 23. The tunnel 24 is dependingly carried by the bottom 23 of the housing 22. Side walls 25 and 26 rise from the bottom 23 at each end of the housing 22 and a top 27 extends over the side walls 25 and 26 and is positioned in back of the rear seat 14 and below the shelf 15. The air conditioning unit of the present invention is installed in the trunk compartment of the automobile and the floor of the body of the automobile is provided with an opening so that the unit may be positioned so that the tunnel 24 extends through the opening in the floor and has one end facing forwardly of the passenger compartment and the other end open and facing rearwardly of the passenger compartment.

Means is provided connecting each of the inlets 16 and 17 in the sides 12 and 13 of the body 10 into communication with the interior of the housing 22 through the adjacent one of the housing side walls 25 and 26, respectively. Specifically, this means includes a flanged collar 28 welded in an opening in each of the housing side walls 25 and 26 and a flexible conduit 29 having one end surrounding the free end of the collar 28 and the other end affixed to the adjacent one of the body sides 12 and 13. The air conditioning unit includes a condenser 30 positioned within the housing 22 and extending over the open top of the tunnel 24.

Superimposed upon and carried by the housing top 27 is a closed chamber 33, the chamber 33 having its top in communication with the inlet 18 by 33' connected in communication with the inlet 18 by means of the conduit 18'. A pair of electrically driven fans 31 and 32 are arranged at the ends of the chamber 33, the inlets of the fans 31 and 32 being connected to the respective ends of the chamber 33. The outlets of the fans 31 and 32 are connected to vertically disposed conduits 34 and 35, respectively, the upper ends of which extend through the shelf 15 into the passenger compartment of the automobile. An elbow conduit 36 is secured to the upper end of each of the conduits 34 and 35 and directs the flow of air forwardly of the passenger compartment.

The air conditioning unit of the present invention includes an evaporator 37 positioned within the chamber 33 between the fans 31 and 32, the inlets into the fans 31 and 32 constituting outlet conduits connected in communication with the chamber 33 and with the compartment in the automobile body.

The air conditioning unit includes a compressor 38 positioned within the housing 22 and operatively connected to the evaporator 37. A hydraulic motor 39 is operatively connected to the compressor 38 for driving the latter.

A fluid pump 40 is mounted upon the automobile engine 19 and is operatively driven by the fan belt 21 so that it rotates when the crankshaft of the engine 19 is rotated. Hydraulic means, including conduits 41 and 42, connect the pump 40 to the fluid motor 39, there being a fluid reservoir 43 and a thermostatic valve 44 interposed in the circuit between the pump 40 and the hydraulic motor 39.

Means is provided operatively connected to the hydraulic means for driving the compressor 38 at a constant speed irrespective of the speed of rotation of the crankshaft of the automobile engine 19. Specifically, this means includes a control valve 45 having a piston 46 therein slidable to open a by-pass conduit 47 upon reaching a predetermined degree of pressure in the fluid as pumped by the pump 40. The control valve 45 includes a needle element 48 adjustably mounted in the valve 45 for controlling the amount of fluid admitted to the hydraulic motor 39. A spring 49 biases the piston 46 to its position normally closing the by-pass conduit 47 until the fluid therein reaches the predetermined degree of pressure. A thermostat 50 is electrically in circuit with the valve 44 for controlling the latter in response to changes in temperature within the passenger compartment of the automobile. The control valve 45 includes a bleeder passage 51 extending from the by-pass conduit 47 to the end of the chamber in which the piston 46 works which contains the spring 49. The purpose of this bleeder passage 51 is to put the pressure of the fluid within the system on the spring end of the piston 46 as well as on the upper end of the piston 46. The rise in pressure due to the adjusted position of the needle element 48 causes the fluid within the control valve 45 to overcome the load of the spring 49 to open the by-pass conduit 47.

Means is provided in the tunnel 24 for operatively causing the ambient air admitted to the housing 22 through inlets 16 and 17 in the body 10 to flow over the condenser 30 and to be exhausted into the tunnel 24 upon forward travel of the automobile in which the air conditioning unit of the present invention is installed. Specifically, this means consists in a first downwardly-sloping wall 52 having its free end adjacent to the free end of a second downwardly-sloping wall 53 provided in the tunnel 24. The free end of the wall 52 is spaced above the bottom wall 54 of the tunnel 24 to form a restricted throat for the passage of air flowing in the directions indicated by the arrows in Figure 4. Air is admitted to the tunnel 24 between the wall 52 and the bottom 54 due to the forward movement of the automobile and passing through the restricted throat is caused to flow at an increased velocity and therefore lesser pressure and draws air from within the housing 22 and outwardly from the open rear end of the tunnel 24.

A horizontally-disposed fan 55 positioned above the condenser 30 is mounted upon the shaft of a vertically-disposed motor 56 for driving cooling air over the condenser 30 irrespective of the speed of the automobile.

The air conditioning unit of the present invention is entirely within or attached to the housing 22 excepting the fluid pump 40 in the reservoir 43 and may be quickly installed as a package within the trunk compartment of any automobile. The thermostatically-controlled valve 44 and the control valve 45 may be installed upon the fire wall of the automobile or otherwise located adjacent to the conduits 41 and 42. Due to the fact that only the conduits 41 and 42 need be connected to the fluid motor 39 after the installation of the unit within the trunk compartment, and the pump 40 connected to the fan belt 21, the installation of the air conditioning unit of the present invention may be easily and quickly accomplished by a relatively unskilled person.

In operation, the pump 40 will supply fluid under pressure to the hydraulic motor 39 irrespective of the speed of the automobile and the air conditioning unit will cool the interior of the passenger compartment to the desired temperature without regard for the forward motion of the automobile. The air conditioning unit of the present invention is therefore an improvement over units which have their compressors driven by the engine crankshaft at a rate corresponding to the rotational rate of the crankshaft.

What is claimed is:

1. The combination with an automobile having a body provided with a passenger compartment including a floor and sides, a rear seat in said compartment, a shelf in back of said seat, there being an inlet in each of the sides of said compartment below said shelf and rearwardly of said seat, said shelf being provided with an inlet, and a crankshaft having an end portion exteriorly and forwardly of said compartment, of an air conditioning unit comprising an upstanding housing including a bottom, side walls rising from said bottom, and a top extending over said side walls, an open ended tunnel extending transversely of and dependingly carried by said bottom and having its top opening into said bottom, said tunnel extending below the floor of said body and having one open end facing forwardly of said compartment and having the other end facing rearwardly of said compartment, means connecting each of the inlets in the sides of said compartment into communication with the interior of said housing through the adjacent side wall of said housing, a condenser positioned within said housing and extending over the open top of said tunnel, a closed chamber superimposed upon and carried by said housing top, means connecting the shelf inlet in communication with the interior of said chamber, an evaporator positioned within said chamber, an outlet conduit having one end in communication with said chamber and having the other end in communication with said compartment, a compressor positioned within said housing and operatively connected to said evaporator, a hydraulic motor operatively connected to said compressor for driving the latter, a pump connected to said crankshaft end portion for rotation with the latter, and hydraulic means connecting said pump to said hydraulic motor.

2. The combination with an automobile having a body provided with a passenger compartment including a floor and sides, a rear seat in said compartment, a shelf in back of said seat, there being an inlet in each of the sides of said compartment below said shelf and rearwardly of said seat, said shelf being provided with an inlet, and a crankshaft having an end portion exteriorly and forwardly of said compartment, of an air conditioning unit comprising an upstanding housing including a bottom, side walls rising from said bottom, and a top extending over said side walls, an open ended tunnel extending transversely of and dependingly carried by said bottom and having its top opening into said bottom, said tunnel extending below the floor of said body and having one open end facing forwardly of said compartment and having the other end facing rearwardly of said compartment, means connecting each of the inlets in the sides of said compartment into communication with the interior of said housing through the adjacent side wall of said housing, a condenser positioned within said housing and extending over the open top of said tunnel, a closed chamber superimposed upon and carried by said housing top, means connecting the shelf inlet in communication with the interior of said chamber, an evaporator positioned within said chamber, an outlet conduit having one end in communication with said chamber and having the other end in communication with said compartment, a compressor positioned within said housing and operatively connected to said evaporator, a hydraulic motor operatively connected to said compressor for driving the latter, a pump connected to said crankshaft end portion for rotation with the latter, hydraulic means connecting said pump to said hydraulic motor, and means operatively connected to said hydraulic means for driving said compressor at a constant speed irrespective of the speed of rotation of said crankshaft end portion.

3. The combination with an automobile having a body provided with a passenger compartment including a floor and sides, a rear seat in said compartment, a shelf in back of said seat, there being an inlet in each of the sides of said compartment below said shelf and rearwardly of said seat, said shelf being provided with an inlet, and a crankshaft having an end portion exteriorly and forwardly of said compartment, of an air conditioning unit comprising an upstanding housing including a bottom, side walls rising from said bottom, and a top extending over said side walls, an open ended tunnel extending transversely of and dependingly carried by said bottom and having its top opening into said bottom, said tunnel extending below the floor of said body and having one open end facing forwardly of said compartment and having the other end facing rearwardly of said compartment, means connecting each of the inlets in the sides of said compartment into communication with the interior of said housing through the adjacent side wall of said housing, a condenser positioned within said housing and extending over the open top of said tunnel, a closed chamber superimposed upon and carried by said housing top, means connecting the shelf inlet in communication with the interior of said chamber, an evaporator positioned within said chamber, an outlet conduit having one end in communication with said chamber and having the other end in communication with said compartment, a compressor positioned within said housing and operatively connected to said evaporator, a hydraulic motor operatively connected to said compressor for driving the latter, a pump connected to said crankshaft end portion for rotation with the latter, hydraulic means connecting said pump to said hydraulic motor, means operatively connected to said hydraulic means for driving said compressor at a constant speed irrespective of the speed of rotation of said crankshaft, and means in said tunnel and operable to cause the ambient air admitted to said housing through said compartment inlets to flow over said condenser and be exhausted into said tunnel upon forward travel of said automobile.

4. The combination with an automobile having a body provided with a passenger compartment including a floor and sides, a rear seat in said compartment, a shelf in back of said seat, there being an inlet in each of the sides of said compartment below said shelf and rearwardly of said seat, said shelf being provided with an inlet, and a crankshaft having an end portion exteriorly and forwardly of said compartment, of an air conditioning unit comprising an upstanding housing including a bottom, side walls rising from said bottom, and a top extending over said side walls, an open ended tunnel extending transversely of and dependingly carried by said bottom and having its top opening into said bottom, said tunnel extending below the floor of said body and having one open end facing forwardly of said compartment and having the other end facing rearwardly of said compartment, and means connecting each of the inlets in the sides of said compartment into communication with the interior of said housing through the adjacent side wall of said housing, a condenser positioned within said housing and extending over the open top of said tunnel, a closed chamber superimposed upon and carried by said housing top, means connecting the shelf inlet in communication with the interior of said chamber, an evaporator positioned within said chamber, an outlet conduit having one end in communication with said chamber and having the other end in communication with said compartment, a compressor positioned within said housing and operatively connected to said evaporator, a hydraulic motor operatively connected to said compressor for driving the latter, a pump connected to said crankshaft end portion for rotation with the latter, hydraulic means connecting said pump to said hydraulic motor, means operatively connected to said hydraulic means for driving said compressor at a constant speed irrespective of the speed of rotation of said crankshaft, and means in said tunnel and operable to cause the ambient air admitted to said housing through said compartment inlets to flow over said condenser and be exhausted into said tunnel upon forward travel of said automobile.

References Cited in the file of this patent
UNITED STATES PATENTS

| | | |
|---|---|---|
| 2,480,510 | Roper | Aug. 30, 1949 |
| 2,530,241 | Harrington | Nov. 14, 1950 |
| 2,743,589 | Kuempel | May 1, 1956 |
| 2,753,696 | Guerra et al. | July 10, 1956 |